United States Patent [19]

Treat

[11] Patent Number: 5,310,836
[45] Date of Patent: May 10, 1994

[54] PROCESS FOR SYNTHESIZING FLUOROPOLYMERS

[75] Inventor: Theodore A. Treat, Washington, W. Va.

[73] Assignee: E. I. Du Pont de Nemours and Company, Wilmington, Del.

[21] Appl. No.: 103,413

[22] Filed: Aug. 12, 1993

[51] Int. Cl.$^5$ ............................................. C08F 2/00
[52] U.S. Cl. ............................... 526/204; 526/247; 526/255; 526/205
[58] Field of Search ............... 526/204, 247, 255

[56] References Cited

U.S. PATENT DOCUMENTS

| | | | |
|---|---|---|---|
| 2,952,669 | 9/1960 | Bro | 260/87.5 |
| 3,462,401 | 8/1969 | Kometani et al. | 260/92.1 |
| 3,528,954 | 9/1970 | Carlson | 260/87.5 |
| 3,635,936 | 1/1972 | Grapper et al. | 260/94.9 |
| 3,642,742 | 2/1972 | Carlson | 260/87.5 |
| 3,984,357 | 10/1976 | Koshar | 526/225 |
| 4,243,783 | 1/1981 | Koshar | 526/225 |
| 4,329,478 | 5/1982 | Behr | 526/204 |
| 4,332,954 | 6/1982 | Koshar | 526/204 |
| 4,340,453 | 7/1982 | Noomem | 526/204 |
| 4,551,511 | 11/1985 | Goel | 526/204 |

Primary Examiner—Joseph L. Schofer
Assistant Examiner—N. Sarofim
Attorney, Agent, or Firm—Edwin Tocker

[57] ABSTRACT

The invention provides a process for polymerizing at least one fluoromonomer in the presence of a cyclic perfluorinated amine. Perfluoro-N-methylmorpholine is a preferred cyclic amine.

11 Claims, No Drawings

PROCESS FOR SYNTHESIZING FLUOROPOLYMERS

FIELD OF THE INVENTION

This invention is in the field of processes to polymerize fluorine-containing monomers in a non-aqueous medium or in a medium that includes a non-aqueous component.

BACKGROUND OF THE INVENTION

It is well known in the art to use fluorine-containing organic compounds as an inert liquid phase in processes to synthesize fluoropolymers. Such processes may be totally non-aqueous as disclosed by Carlson in U.S. Pat. No. 3,528,954, or the fluorine-containing compound may be used in mixture with water. In these mixed-media processes, the water and the non-aqueous component have low mutual solubility and may be present in a wide range of relative concentrations as illustrated, for example, by Gresham et al. in U.S. Pat. No. 3,635,936 and by Kometani et al. in U.S. Pat. No. 3,462,401 and by Adachi et al. in Japanese patent application publication 03-017106. A favored material for this use has been 1,1,2-trichloro-1,2,2-trifluoroethane (CFC-113). However, concern about damage in the earth's ozone layer makes it especially desirable to find an alternative to perhaloalkanes containing chlorine for use as a polymerization medium for fluoropolymers.

Certain alternatives are known in the prior art. Carlson in U.S. Pat. No. 3,642,742 mentions perfluorocyclobutane, perfluorocyclohexane, and perfluorodimethyl cyclobutane. Bro in U.S. Pat. No. 2,952,669 illustrated the polymerization of tetrafluoroethylene (TFE) to polytetrafluoroethylene (PTFE) in perfluorotributylamine. There have been subsequent references to perfluorotributylamine and other perfluorotrialkylamines in polymerization of fluorine-containing monomers. These prior-art compounds do not adequately dissolve hydrocarbon monomers, have global warming potential, and/or have not achieved commercial utility.

SUMMARY OF THE INVENTION

The present invention involves the discovery of a group of chlorine-free liquids that can be used in place of chlorofluorocarbons in the various processes for synthesizing fluoropolymers.

Thus, this invention provides a process for polymerizing at least one fluoromonomer in the presence of an organic compound that is cyclic perfluorinated tri-substituted amine having no N—F bond, substantially replacing the non-aqueous solvent that would otherwise be present. Such amine includes those having the general formula

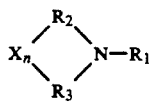
(I)

in which:

R$_1$ is a linear or branched saturated perfluorocarbon group having 1–4 carbon atoms, R$_2$ and R$_3$ are linear or branched saturated perfluorocarbon groups having, independently, 0–5 carbon atoms and, together, at least 2 carbon atoms, X is a hetero atom selected from N, O and S, or a perfluorinated group containing said hetero atom, n=0 or 1, the number of atoms bonded in the ring is at least 4, and the total number of carbon atoms is 3–12.

DETAILED DESCRIPTION

In order to be suitable as the liquid medium for synthesis of fluoropolymers having useful molecular weight, or as a component of the medium, it is desired that an organic compound have certain properties. It is desired that the compound be low in telogenic activity. If the polymerization reaction takes place in the compound, or in the compound phase as opposed to the aqueous phase if water is present, it is desired that the compound have adequate solvating power for the monomers used in the specific reaction scheme and for the initiator of choice. If water is present, it is desired that the compound and water have low mutual solubility. It is also desired that the compound have a boiling point appropriate to the temperature and pressure conditions of the reaction, i.e., to be a liquid, and a vapor pressure appropriate for post-polymerization separation of the compound from the fluoropolymer. Additionally, it is highly desired that the compound can be handled safely and for it to be low in potential for damage to the ozone layer. Along with economic requirements, this list of desired attributes presents a severe set of selection criteria for organic compounds to be used in the medium for polymerizing fluoromonomers, and it is not obvious how to select a compound that will satisfy these criteria simultaneously.

It has been discovered that perfluorinated cyclic tri-substituted amines having at least one nitrogen atom in the ring and no N—F bond, having at least four atoms in the ring, having a total of 3–12 carbon atoms, and optionally containing another hetero atom, satisfy all of the functional requirements recited above for use as media or as components of media in processes for polymerizing fluoromonomers. Furthermore, these compounds have no ozone depleting potential, and are expected to have lower global warming potential than perfluorocarbon compounds.

Among the perfluorinated cyclic tri-substituted amines having no N—F bond, useful in this invention are those of the general formula

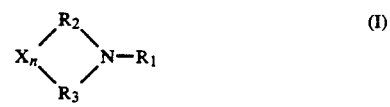
(I)

in which:

R$_1$ is a linear or branched saturated perfluorocarbon group having 1–4 carbon atoms, R$_2$ and R$_3$ are linear or branched saturated perfluorocarbon groups having, independently, 0–5 carbon atoms and, together, at least 2 carbon atoms, X is a hetero atom selected from N, O and S, or a perfluorinated group containing said hetero atom, n=0 or 1, the number of atoms bonded in the ring is at least 4, and the total number of carbon atoms is 3–12.

Examples of compounds of formula (I) include perfluoro-N-methylpyrolidine, perfluoro-N-methylpiperidine, perfluoro-N-methyl-1,3-thiazine, perfluoro-N-methylmorpholine, perfluoro-N-isopropylmorpholine, perfluoro-N,N-dimethyl-1,3-imidazolidine, and perfluoro-1,4-N,N-dimethylpiperazine. Preferred compounds of formula (I) are those in which the total number of carbon atoms is 3-10, especially 4-8, the number of atoms bonded in the ring is 5-6, and X is O or a group containing N. Especially preferred compounds are those in which $R_2$ and $R_3$ are $-CF_2CF_2-$, X is O or $n=0$, and $R_1$ has 1-3 carbon atoms. Perfluoro-N-methylmorpholine (PFNMM) is most preferred. Examples of these compounds are disclosed in J. Chem. Soc. 1965 p6078, J. Chem. Soc. 1971 (C) p2922, and J. Fluorine Chem. 1990 p16. The use of perfluoro-N-ethylmorpholine as a solvent to make solutions of copolymers of TFE and perfluorinated sulfonyl fluoride- or carboxyl-containing vinyl monomers is disclosed by Silva et al. in U.S. Pat. No. 4,348,310. Perfluoro-N-isopropylmorpholine is available commercially ("Fluorinert" FC-6003, 3M Company).

The process of this invention may employ any of the techniques known to use a medium containing a liquid (solvent) other than water. These include but are not limited to non-aqueous polymerization and the various methods using a solvent-water mixture such as suspension polymerization and aqueous emulsion polymerization in the presence of a non-aqueous liquid phase. Thus, the amount of cyclic amine used in the present invention can be essentially the same amount as that of prior halocarbon solvents, ranging from the entire polymerization medium to a small proportion thereof if water is present, e.g., 1 vol % or possible even lower. Preferably, the perfluorinated cyclic amine replaces all of the non-aqueous liquid that would otherwise be used in the polymerization medium. This means that all of the liquid present as the polymerization medium can be chlorine-free. A minor proportion of chlorine-containing non-aqueous liquid, e.g., CFC-113, can be present, i.e., the non-aqueous liquid is only substantially replaced by the cyclic amine, and the polymerization can still be carried out but with the disadvantage accompanying the presence of chlorine in the medium.

As known to one skilled in the art, various ingredients appropriate to the type of polymerization will be used. It may be appropriate to use chain transfer agents for purposes such as regulating molecular weight or molecular weight distribution, altering the structure of end groups, or introducing desirable fragments into the molecule to serve as cure site moieties. The choice of chain transfer agent will vary with the polymer to be formed, the medium, and the desired effect. A suitable means of initiating the polymerization reaction will be selected. In general, the initiator should be capable of initiating the reaction at the operating temperature. Normally, for non-aqueous and suspension processes in which the polymerization reaction takes place in the organic compound phase, an initiator soluble in the organic compound will be used. If the reaction takes place in the aqueous phase of a mixed medium, a water-soluble initiator will ordinarily be used. If the reaction in the aqueous phase is to be an emulsion polymerization, a suitable emulsifier (surfactant) may be used. Other ingredients such as but not limited to buffering agents to control pH and chain transfer agents to control molecular weight and end group composition may be used as known to those skilled in the art.

Fluoropolymers that may be synthesized by the process of this invention include, but are not limited to, the broad spectrum of thermoplastic or elastomeric polymers that may be synthesized using other fluorine-containing solvents. These fluoropolymers may be homopolymers of a fluoromonomer, may be copolymers of two or more fluoromonomers, or may be copolymers of at least one fluoromonomer and at least one fluorine-free monomer. By fluoromonomers are meant compounds that may be free radically polymerized, that contain at least one fluorine atom, fluoroalkyl group, or fluoroalkoxy group attached to the vinyl group that undergoes polymerization. Useful fluoromonomers include, but are not limited to, vinyl fluoride; vinylidene fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether, and perfluoro(propyl vinyl) ether (PPVE); perfluoro (1,3-dioxole); perfluoro(2,2-dimethyl-1,3-dioxole) (PDD); $CF_2=CFOCF_2CF(CF_3)OCF_2CF_2SO_2F$; $CF_2=CFOCF_2CF(CF_3)OCF_2CF_2CO_2F$; $CF_2=CFOCF_2CF_2CF_2SO_2F$; $F(CF_2)_nCH_2OCF=CF_2$ wherein n is 1, 2, 3, 4 or 5; $R_1CH_2OCF=CF_2$ wherein $R_1$ is hydrogen or $F(CF_2)_m-$ and m is 1, 2 or 3; and $R_3OCF=CH_2$ wherein $R_3$ is $F(CF_2)_z-$ and z is 1, 2, 3 or 4; perfluorobutyl ethylene (PFBE); 3,3,3-trifluoropropene and 2-trifluoromethyl-3,3,3-trifluoro-1-propene. Preferred fluoromonomers are 3,3,3-trifluoropropene, 2-trifluoromethyl-3,3,3-trifluoro-1-propene, PFBE, vinyl fluoride, vinylidene fluoride, TFE, HFP, PMVE, PPVE, CTFE, and PDD.

The fluoromonomer may be polymerized alone to form a homopolymer if the fluoromonomer usually can be homopolymerized, or may be polymerized with one or more other fluoromonomers or other monomers that are not fluoromonomers to form a copolymer. If a copolymer is to be formed, the monomers chosen must be able to copolymerize. Fluorine-free monomers that copolymerize with some combinations of fluoromonomers include propylene and ethylene. Examples of useful homopolymer fluoropolymers include polytetrafluoroethylene (PTFE) prepared by the suspension and emulsion polymerization processes. Also usually classed with homopolymer PTFE are the modified PTFE polymers containing fluoromonomers other than TFE in such minor amounts that the modified polymers retain the non-melt-fabricable character of PTFE. Examples of useful copolymers include the copolymers of TFE with HFP and/or PPVE, copolymers of TFE with PMVE, copolymers of TFE with PDD, and copolymers of TFE or CTFE with ethylene. Further examples include the copolymers of vinylidene fluoride with HFP, or with HFP and TFE. As implied above, copolymers may contain additional monomers beyond those named. TFE/ethylene copolymers, for example, are most useful if they include additional monomers such as PFBE, HFP, PPVE or 2-trifluoromethyl-3,3,3-trifluoro-1-propene, and elastomeric polymers frequently include low concentrations of cure site moieties derived from a cure site monomer and/or a chain transfer agent.

EXAMPLES

TFE/PPVE copolymer compositions made in the Examples were determined by Fourier transform infrared spectroscopy employing the method described in U.S. Pat. No. 4,743,658 on films approximately 0.05 mm thick, compression molded at 350° C. and immediately quenched in ice water.

TFE/HFP copolymer compositions made in the Examples were determined by infrared spectroscopy on 0.097–0.107 mm thick films pressed at 300° C. Fourier transform infrared spectroscopy was employed in the method described in U.S. Pat. No. 4,380,618. In applying this method, the peak absorbances of bands found at about 10.18 mm and at about 4.25 mm were used, not the absorbances at these exact wavelengths unless they were also the peak absorbances. HFP content is expressed as an index HFPI, the ratio of the peak absorbance at 10.18 m to the peak absorbance at 4.25 m. Multiplication of HFPI by 3.0 would yield the HFP content in wt % according to current calibration by $^{19}F$ NMR.

The melt viscosity (MV) of TFE/PPVE and TFE/HFP copolymers was measured at 372° C. using the apparatus of ASTM D-1238 with a 5 kg weight.

The melting temperature of polymer samples was determined as the temperature of the endothermic peak by differential scanning calorimetry (DSC) according to the method of ASTM D-4591-87 at a heating rate of 10° C./min.

EXAMPLE 1

Into an evacuated, one liter, stainless steel, agitated pressure vessel were charged 800 ml of PFNMM (L-12422, 3M Company), 0.38 g of ethane chain transfer agent, and 20 ml of perfluoro(propyl vinyl) ether (PPVE). The mixture was heated to 60° C. while agitating at 1000 rpm, and TFE was charged to the vessel until the pressure was 68 psig (0.47 MPa). A solution of bis(perfluoropropionyl) peroxide (3P) in CFC-113 with a concentration of 0.0036 g/ml was prepared. Then, 10 ml of the initiator solution was pumped into the vessel. At kick-off of the polymerization reaction as indicated by a 3-psig pressure drop, continuous addition of the initiator solution at the rate of 0.5 ml/min and continuous addition of TFE to maintain the pressure at 69 psig were started. After 15 min of reaction measured from kick-off, the TFE and 3P solution feeds were shut off and the reaction vessel was cooled to 30° C. After venting, a polymer slurry was removed from the bottom of the reactor. Most of the solvent was allowed to evaporate in a vented hood at room temperature, and remaining traces were then driven off in a circulating air oven at 150° C. The dry polymer weighed 14.3 g, had MV of $2.55 \times 10^3$ Pa·s, and contained 4.44 wt % PPVE.

EXAMPLE 2

The procedure of Example 1 was repeated except that no ethane chain transfer agent was used. Polymer obtained (11.7 g) had MV of $51.5 \times 10^3$ Pa·s and PPVE content of 3.93 wt %. Examples 1 and 2 together show that TFE/PPVE copolymer with a wide range of molecular weight can be made in PFNMM solvent.

COMPARATIVE EXAMPLE A

The procedure of Example 1 was repeated except that the same amount of CFC-113 was used as the polymerization medium instead of PFNMM. Polymer obtained (23.2 g) had MV of $9.09 \times 10^3$ Pa·s and PPVE content of 4.50 wt %.

EXAMPLE 3

A one-gallon (3.79 l) agitated polykettle was charged with 2350 ml of demineralized water and evacuated to remove oxygen. Then, 35 ml of PFNMM, 20 ml of PPVE, and 5.7 g of ammonium perfluorooctanoate dissolved in 50 ml of water were added. Agitation was started at 110 rpm. The polykettle and contents were heated to 75° C. and the polykettle was pressured with TFE to 300 psig (2.07 MPa). An initiator solution composed of 4 g of ammonium persulfate and 18 ml of 30% ammonium hydroxide per liter of water was pumped into the polykettle at a rate of 5 ml/min for 12 min, and thereafter at a rate of 0.2 ml/min. After 5 min from the start of initiator addition, polymerization had begun as evidenced by a 5 psi pressure drop. At that point, TFE feed was started to maintain the pressure at 300 psig and PPVE was pumped into the polykettle at the rate of 0.2 ml/min. The agitator speed was adjusted to maintain a TFE consumption rate of 7.56 g/min. The temperature was maintained at 75° C. When 900 g of TFE had been added after the start of polymerization, the TFE, PPVE, and initiator feeds were stopped, the agitator was turned off, the polykettle was vented and cooled to 50° C., and an aqueous dispersion of polymer was discharged. Coagulation of the dispersion by agitation, and separation of wet polymer from the mother liquor by filtration followed by drying at 150° C. in a circulating air oven yielded 900 g of dry TFE/PPVE copolymer powder. The polymer had MV of $4.63 \times 10^3$ Pa·s, PPVE content of 2.83 wt %, and crystalline melting point of 306.8° C.

COMPARATIVE EXAMPLE B

The procedure of Example 3 was repeated except that CFC-113 was used instead of PFNMM to obtain 900 g of polymer with MV of $3.95 \times 10^3$ Pa·s, PPVE content of 3.32 wt %, and melting point of 305.5° C.

EXAMPLE 4

A one-gallon (3.79 l) agitated polykettle was charged with 1600 ml of demineralized water and evacuated to remove oxygen. Then, 900 ml of PFNMM, 18 ml of PPVE, and 5 ml of methanol were added. Agitation was started at 110 rpm. The polykettle and contents were heated to 40° C. and the polykettle was pressured with TFE to 42 psig (0.29 MPa). An initiator solution composed of 1 wt % $[n-C_3F_7OCF(CF_3)COO]_2$ in PFNMM was charged to the polykettle at a rate of 5 ml/min for 8 min and thereafter at a rate of 2.0 ml/min. After 6 min from the start of initiator addition, polymerization had begun as evidenced by a 5 psi pressure drop. At that point, TFE feed was started to maintain the pressure at 42 psig. The agitator speed was maintained at 110 rpm. The temperature was maintained at 40° C. When about 450 g of TFE had been added after the start of polymerization, the TFE and initiator feeds were stopped, the agitator was turned off, the polykettle was vented, and the water was drained from the polykettle. The solvent-wetted polymer mass was removed from the polykettle and was stirred with hot water to drive off the solvent. Then, the polymer was filtered out of the water and dried in a circulating air oven at 150° C. Yield was about 450 g of dry TFE/PPVE copolymer powder. The polymer had MV of $2.79 \times 10^3$ Pa·s and PPVE content of 4.37 wt %.

COMPARATIVE EXAMPLE C

The procedure of Example 4 was repeated except that 900 ml of CFC-113 instead of PFNMM and 10 ml of methanol were used in the polykettle charge, and the solvent for the initiator solution was also CFC-113. The yield was about 450 g of copolymer powder with MV of $2.11 \times 10^3$ Pa·s and PPVE content of 4.46 wt %.

EXAMPLE 5

A one-gallon (3.79 l) agitated polykettle was charged with 1850 ml of demineralized water and evacuated to remove oxygen. Then 50 ml of PFNMM and 2.9 g of ammonium perfluorooctanoate dissolved in 500 ml of water were added. Agitation was started at 110 rpm. The polykettle contents were heated to 70° C. and 590 g of HFP were charged to the polykettle. TFE was then added to increase the pressure by 120 psi above the pressure after HFP addition. An initiator solution composed of 18 g of ammonium persulfate and 6.5 g of potassium persulfate per liter of water was added at the rate of 20 ml/min for 10 min for a total addition of 200 ml of initiator solution. After kick-off as evidenced by a 10 psi pressure drop, TFE was fed to maintain the pressure attained after original TFE addition. After 817 g of TFE had been added following kick-off, the agitator and TFE addition were stopped and the polykettle was vented over a 10 min time interval. Residual HFP monomer was removed by three times evacuating to $-10$ psig and pressuring with nitrogen to $+10$ psig, and the dispersion was discharged. Coagulation of the dispersion by agitation, and separation of wet polymer from the mother liquor by filtration followed by drying at 150° C. in a circulating air oven yielded 830 g of dry copolymer powder. The polymer had MV of $13.6 \times 10^3$ Pa·s and HFPI of 2.99.

COMPARATIVE EXAMPLE D

The procedure of Example 5 was repeated except that 50 ml of CFC-113 were used instead of 50 ml of PFNMM. The yield was 800 g of dry polymer that had MV of $10.5 \times 10^3$ Pa·s and HFPI of 3.18.

EXAMPLE 6

An evacuated, one-liter, stainless steel, agitated pressure vessel was charged with 750 ml of PFNMM, 3.0 ml of perfluorobutyl ethylene (PFBE), and 3.0 ml of cyclohexane. The mixture was heated to 60° C. while agitating at 1000 rpm. The reactor was then pressured to 104 psig with TFE and then to 139 psig by adding ethylene. A solution of bis-perfluoropropionyl peroxide initiator in CFC-113 (0.00263 g/ml) was added by charging 50 ml rapidly and then continuing addition at the rate of 1.2 ml/min. After kick-off as evidenced by a 5 psi pressure drop, TFE and ethylene in a 50/50 molar mixture were added to maintain pressure at 139 psig. The temperature was maintained at 60° C. After 20 min from start of initiator addition, the mixed monomer feed and initiator addition were stopped, and the reactor was cooled to 30° C. and vented. The polymer gel was removed, and the solvent was allowed to evaporate in a vented hood and circulating air oven at 150° C. The polymer obtained weighed 20.7 g, had hydrocarbon content of 21.1 wt %, PFBE content of 4.7 wt %, and MV of $1.33 \times 10^3$ Pa·s at 297° C. by the method of ASTM D-3159-83.

What is claimed is:

1. In the process for synthesizing a fluoropolymer, comprising polymerizing at least one fluoromonomer in a polymerization medium containing a non-aqueous liquid phase, the improvement comprising carrying out said polymerization in the presence of a perfluorinated cyclic tri-substituted amine having the nitrogen atom in the ring and no N—F bond, having at least four atoms in the ring, having a total of 3-12 carbon atoms, and optionally containing an additional hetero atom, substantially constituting said non-aqueous liquid phase.

2. The process of claim 1, wherein the perfluorinated cyclic amine has the general formula

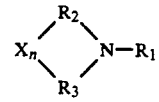

in which:

$R_1$ is a linear or branched saturated perfluorocarbon group having 1-4 carbon atoms, $R_2$ and $R_3$ are linear or branched saturated perfluorocarbon groups having, independently, 0-5 carbon atoms and, together, at least 2 carbon atoms, X is a hetero atom selected from N, O and S, or a perfluorinated group containing said hetero atom, n=0 or 1, the number of atoms bonded in the ring is at least 4, and the total number of carbon atoms is 3-12.

3. The process of claim 2, wherein the total number of carbon atoms in said perfluorinated cyclic amine is 4-8.

4. The process of claim 2, wherein said hetero atom is O.

5. The process of claim 2, wherein $R_2$ and $R_3$ are each —$CF_2CF_2$—, X is O, and R1 has 1-3 carbon atoms.

6. The process of claim 5, wherein the cyclic amine is perfluoro-N-methylmorpholine.

7. The process of claim 1, wherein the fluoropolymer contains the fluoromonomer tetrafluoroethylene.

8. The process of claim 7, wherein the fluoropolymer is a copolymer of tetrafluoroethylene with at least one member of the group consisting of perfluoroolefins and perfluoro(alkyl vinyl) ethers.

9. The process of claim 8, wherein the perfluoroolefin is hexafluoropropylene.

10. The process of claim 8, wherein the perfluoro(alkyl vinyl) ether is perfluoro(propyl vinyl) ether.

11. The process of claim 7 wherein the fluoropolymer is copolymer of tetrafluoroethylene with ethylene, optionally including one or more additional monomers.

* * * * *